(12) United States Patent
Oura et al.

(10) Patent No.: US 8,503,864 B2
(45) Date of Patent: *Aug. 6, 2013

(54) ENCODED DATA RECORDING APPARATUS AND MOBILE TERMINAL

(75) Inventors: Seiji Oura, Kawasaki (JP); Yuichi Sato, Tokyo (JP); Yasunori Arai, Fuchu (JP); Osamu Yamagishi, Tokyo (JP); Yoshihiro Kataoka, Tokyo (JP); Hiroshi Ogasawara, Sagamihara (JP); Koichi Ito, Hino (JP); Kentoku Yamaguchi, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1090 days.

This patent is subject to a terminal disclaimer.

(21) Appl. No.: 12/109,871

(22) Filed: Apr. 25, 2008

(65) Prior Publication Data
US 2008/0205852 A1    Aug. 28, 2008

Related U.S. Application Data

(63) Continuation of application No. 09/959,681, filed as application No. PCT/JP01/01740 on Mar. 6, 2001, now Pat. No. 7,376,330.

(30) Foreign Application Priority Data

Mar. 6, 2000    (JP) .................................. 2000-061214

(51) Int. Cl.
*G11B 27/00*    (2006.01)
*H04N 5/93*    (2006.01)
*H04N 5/89*    (2006.01)
*H04N 5/84*    (2006.01)
*H04N 5/92*    (2006.01)
*H04N 5/917*    (2006.01)

(52) U.S. Cl.
USPC ........... 386/288; 386/326; 386/329; 386/332; 386/353; 386/356

(58) Field of Classification Search
USPC ................. 386/288, 326, 329, 332, 353, 356
See application file for complete search history.

(56) References Cited

U.S. PATENT DOCUMENTS

| | | | |
|---|---|---|---|
| 5,477,397 A | | 12/1995 | Naimpally et al. |
| 5,884,067 A | * | 3/1999 | Storm et al. ................... 345/533 |
| 5,996,023 A | * | 11/1999 | Winter et al. ................. 709/253 |
| 6,012,091 A | * | 1/2000 | Boyce ........................... 709/219 |

(Continued)

FOREIGN PATENT DOCUMENTS

| | | |
|---|---|---|
| EP | 0 627 854 | 12/1994 |
| EP | 0 700 214 | 3/1996 |
| JP | 5-95547 | 4/1993 |
| JP | 8-97939 | 4/1996 |
| JP | 8-275170 | 10/1996 |

*Primary Examiner* — Daquan Zhao
(74) *Attorney, Agent, or Firm* — Maschoff Brennan

(57) ABSTRACT

In a mobile terminal provided with an encoded data recording function, there is assumed a condition in which a picture frame transmitted from the terminal of a communication partner is reproduced by means of decoding processing and is displayed on a LCD (34) during wireless TV phone communication. In this condition, when a user carries out a picture recording start operation, display picture data reproduced by means of decoding processing in the multimedia processing section (24) to be displayed on the LCD (34) are recorded in a main recording section (26).

12 Claims, 11 Drawing Sheets

U.S. PATENT DOCUMENTS 6,028,539 A * 2/2000 Matsui ........................... 341/55
6,181,870 B1 * 1/2001 Okada et al. .................. 386/241
6,198,499 B1 * 3/2001 Tatsumi ..................... 348/14.01
6,643,453 B1 11/2003 Arai et al.

* cited by examiner

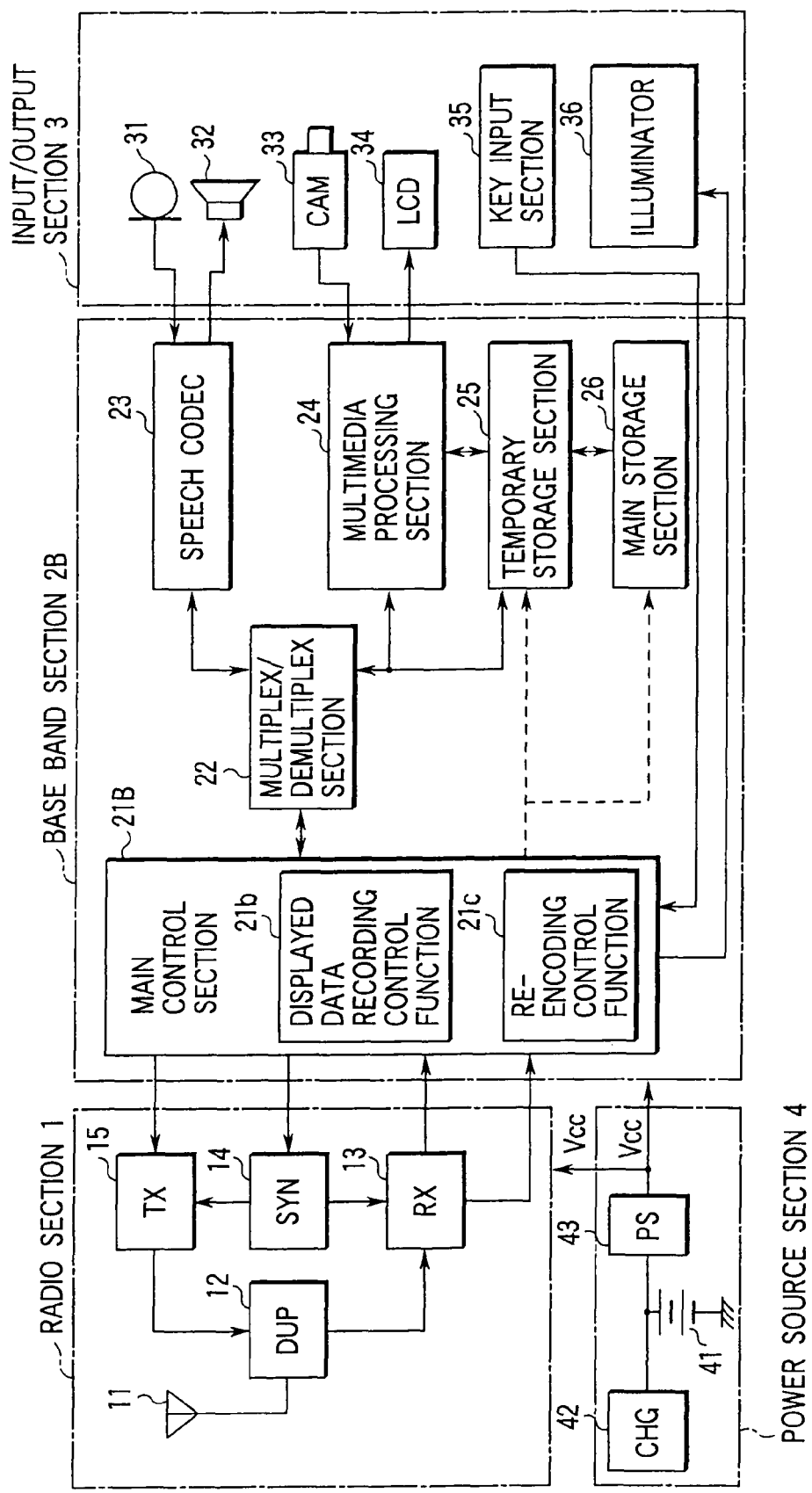
F I G. 8

ENCODED DATA RECORDING APPARATUS AND MOBILE TERMINAL

CROSS REFERENCE TO RELATED APPLICATIONS AND INCORPORATION BY REFERENCE

This application is a continuation of and claims the benefit of priority under 35 USC §120 from U.S. Ser. No. 09/959,681, filed Jan. 31, 2002, the entire content of which is incorporated herein by reference, which is the National Stage of PCT/JP01/01740, filed Mar. 6, 2001, and is based upon and claims the benefit of priority under 35 USC §119 from the Japanese Patent Applications No. 2000-61214, filed Mar. 6, 2000.

TECHNICAL FIELD

The present invention relates to an encoded data recording apparatus and a mobile terminal used for example in a system handling encoded data.

BACKGROUND ART

In recent years, various information transmission systems such as a broadcasting system, a cable communication system and a mobile communication system have been put to practical use or planed, and as a result thereof, various terminals have been developed.

For example, in a mobile communication system, mobile terminals such as mobile phones and PDAs (Personal Digital Assistants) are used. In this kind of terminals, not only voice communication service, but also various transmission services such as SMS (Short Message Service), electronic mail service and information distribution service using wireless internet are available. When data including a large amount of information such as motion picture data (or video data) are tried to transmit in the mobile communication system, they cannot be transmitted as they are because the transmission path band causes a bottleneck.

So, a compression/extension processing of video data is required in transmitting motion picture data wirelessly, and as one means of realizing the processing, the employment of a compression/extension scheme called MPEG-4 (Moving Picture Experts Group-4) is being discussed.

MPEG-4 represents data having correlations on the time axis such as video data with an initial frame and a difference frame. The initial frame is called I-Frame (Intra-coded Frame) and contains whole picture information elements (absolute value information) of one picture obtained by being compressed as a still picture. That is, the I-Frame composes a picture frame having an independent meaning alone. In contrast thereto, the difference frame is called P-Frame (Predictive-coded Frame) and mainly contains difference information between the picture of the current frame and the picture of the preceding frame. And, in the first timing after the start of transmission an I-Frame is transmitted, and in the subsequent frame timings P-Frames are transmitted sequentially. By using MPEG-4, motion picture data having an amount of information equivalent to several Mbps can be transmitted with being compressed to several ten Kbps.

However, in a system employing such a compression/extension scheme, if the video recording button of the apparatus is pushed in receiving data, only difference frames can be recorded, and as a result thereof, it becomes difficult to reproduce pictures effectively from the recorded video data.

So, in MPEG-4, an idea that the picture of each P-Frame is divided into a large number of blocks and that absolute value information is transmitted in a part of blocks selected optionally from each P-Frame is employed. The blocks in which the absolute value information is transmitted are called a macro-block respectively. By receiving a plurality of P-Frames and synthesizing the macro-blocks thereof, the apparatus can reproduce one picture data equivalent to picture data of the I-Frame.

Therefore, even if the picture recording button of the apparatus is pushed in receiving picture data, one picture data comprising absolute value information can be reproduced by receiving the same number of P-Frames as the macro-blocks constituting one picture.

However, in a period from the start of video recording to the end of receiving the same number of P-Frames as the macro-blocks constituting one picture, one picture data comprising absolute value information cannot be reproduced. The above-described period lasts, for example, about 10 seconds. As a result thereof, users may fail to record video data of desired scenes.

DISCLOSURE OF INVENTION

The present invention has an object of providing an encoded data recording apparatus and a mobile terminal adapted to be able to record high-quality data immediately after inputting a recording instruction even if the recording is begun during data input or data reception.

In order to attain the above-described object, the encoded data recording apparatus according to the present invention is an apparatus recording encoded data composed of first data generated in the initial frame timing and a plurality of second data generated respectively in the subsequent frame timings and comprises an encoded data input means for inputting the encoded data, a data reproduction processing means for reproducing the original data based on the first data and the second data of the encoded data inputted by the data input means, a recording period specifying means for specifying the recording period of the encoded data from a user of the apparatus, and a recording control means. And, when the recording period is specified by the recording period specifying means in inputting the encoded data, the original data reproduced by the data reproduction processing means in the recording period concerned is recorded in a recording medium by the recording control means.

Therefore, according to the present invention, when a recording instruction is inputted in receiving data, the original data reproduced by the data reproduction processing means will be recorded in the recording medium from this time on. Accordingly, high-quality original data equivalent to the first data can be recorded immediately after the recording instruction was inputted. Therefore, recorded data are reproduced, high-quality data can be reproduced from the time of having inputted the recording instruction.

Moreover, the present invention is characterized in that the recording control means records original data reproduced by the data reproduction processing means in the recording medium in the first frame timing of the recording period and in that it records second data inputted by the encoded data input means in the recording medium in the frame timings following the first frame timing respectively.

Further, the present invention is characterized in that the recording control means re-encodes original data into first data and a plurality of second data when it records reproduced original data in the recording medium. And, the present invention is also characterized in that the first data and the plurality of second data obtained by the re-encoding are recorded in the recording medium.

Due to such a composition, original data equivalent to first data are recorded only at the starting time of recording, and in the subsequent recording period inputted first data is recorded as it is. Accordingly, the amount of data recorded in the recording medium can be reduced substantially through the recording period in comparison to storing reproduced original data. Therefore, the storage capacity of a recording medium can be used more effectively, and it becomes possible to prolong the recording time of data.

Further, in the present invention, the recording control means temporarily holds original data reproduced by the data reproduction processing means in the recording period till the input period of the encoded data ends. And, the present invention is also characterized in that after the end of the input period of the encoded data the temporarily held original data are re-encoded in first data and a plurality of second data and are recorded in the recording medium.

Due to such a composition, the amount of data recorded in the recording medium can be reduced substantially to prolong the data recording time. Moreover, it becomes possible to carry out the processing of re-encoding reproduced original data into first data and second data except in the receiving period and the recording period of encoded data. As a result thereof, no concentrated processing load can be realized in receiving and recording encoded data, thereby reducing the processing burden of a CPU or a DSP.

BRIEF DESCRIPTION OF DRAWINGS

FIG. 8 is a block diagram showing the functional organization of a mobile terminal that is a second embodiment of the encoded data recording apparatus according to the present invention;

BEST MODE FOR CARRYING OUT OF THE INVENTION

Now, several embodiments of the encoded data recording apparatus according to the present invention will be described with reference to the drawings.

First Embodiment

In a first embodiment of the present invention, the present invention is applied to a mobile terminal having an encoded data recording function. It is assumed that a picture frame transmitted from the terminal of a communication partner side is decoded and displayed on a display section during communication by means of wireless TV phones using MPEG-4. When a user carries out a recording start operation in this condition, decoded video data generated to be displayed on the display section are recorded sequentially in a main recording section till a video recording end operation is carried out.

Figure 1:
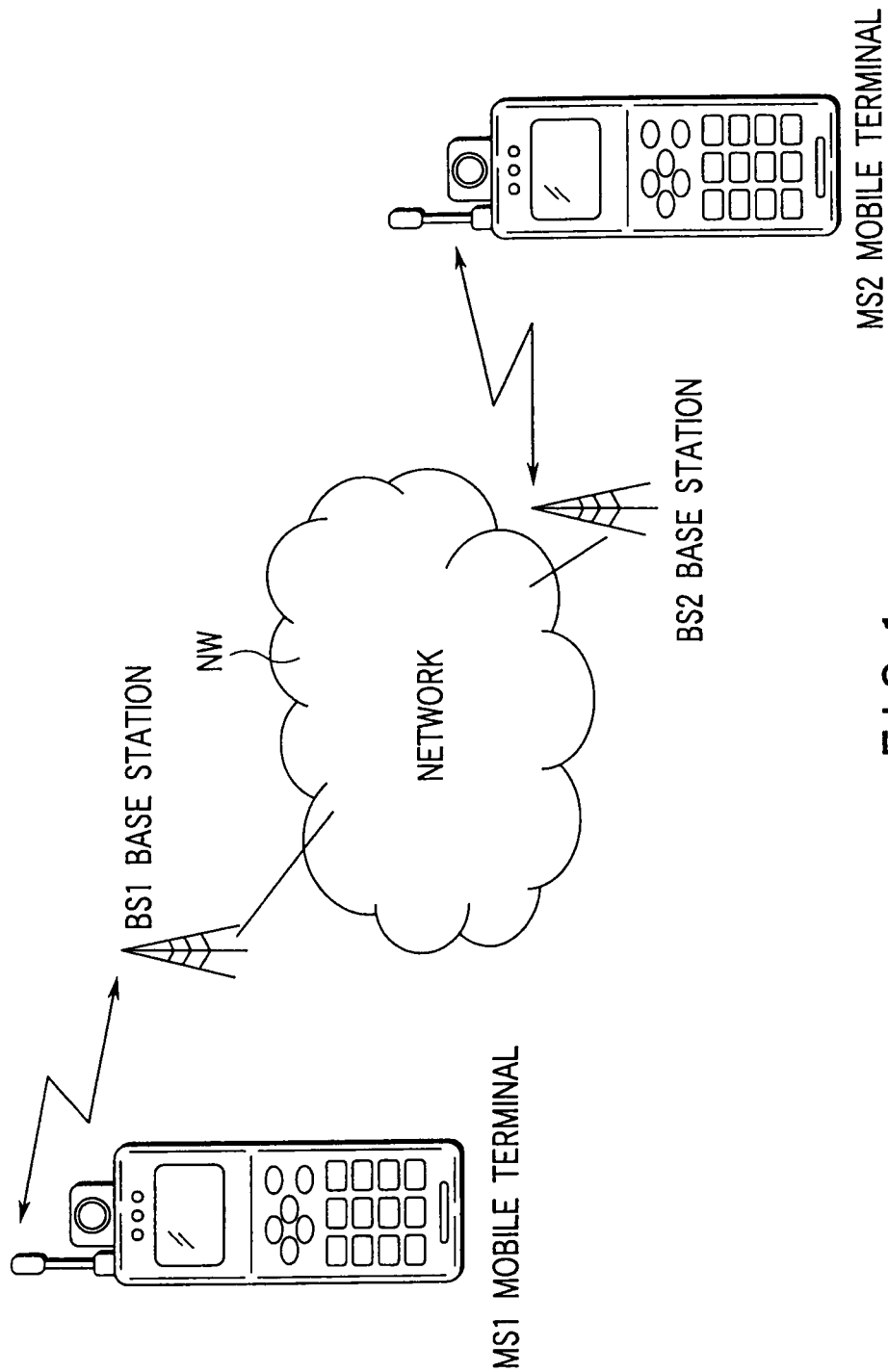
FIG. 1 is a view showing the schematic organization of a mobile communication system that is a first embodiment of a data transmission system in which an encoded data recording apparatus according to the present invention is used.

FIG. 1 is a schematic organization view of a mobile communication system according to this first embodiment. In the same figure, a plurality of base stations BS1, BS2, . . . are distributed in a service area covered by the system. These base stations BS1, BS2, . . . are connected respectively to a network NW. Mobile terminals MS1, MS2, . . . are connected respectively to the nearest base stations BS1, BS2, . . . over radio channels and are further connected from these base stations BS1, BS2, . . . to the network NW. In the network NW, corresponding to the calling requests of the mobile terminals MS1, MS2, . . . , a processing for connecting between the mobile terminals MS1 and MS2 by means of switching is carried out. And, once a communication link has been established between the mobile terminals MS1 and MS2 by means of the switching connection processing, TV phone communication is subsequently permitted between these mobile terminals MS1 and MS2.

Moreover, as the above-described wireless access scheme, a W-CDMA (Wideband-Code Division Multiple Access) scheme is, for example, used. As other wireless access schemes, a cdma 2000 scheme, a FDMA (Frequency Division Multiple Access) scheme, a TDMA (Time Division Multiple Access) scheme, or a Narrowband CDMA scheme may be also employed.

Figure 2:
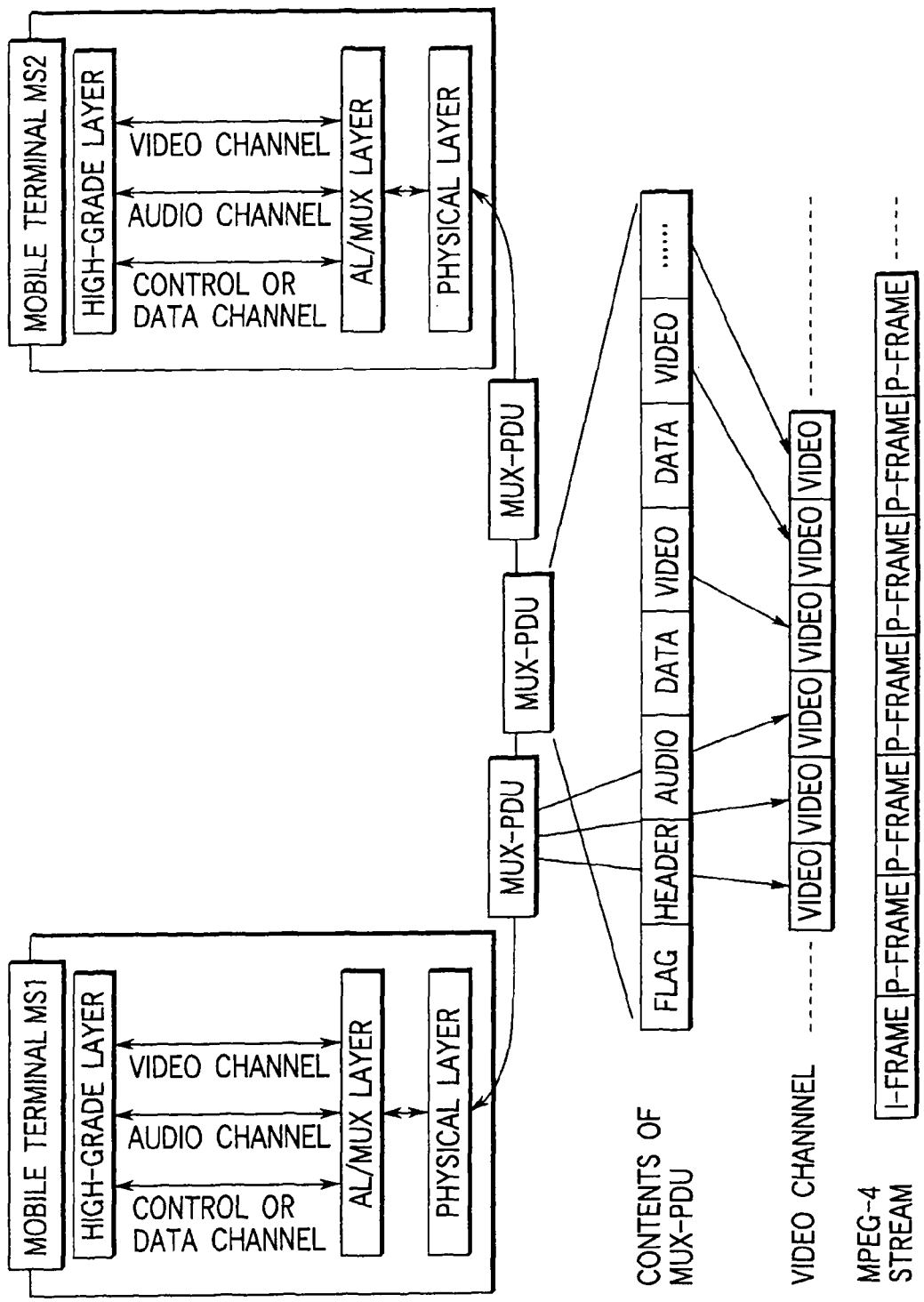
FIG. 2 is a view showing the layer structure of a multimedia transmission system according to MPEG-4.

FIG. 2 is a view showing the scheme of wireless TV phone communication in the mobile communication system by means of multiplexing transmission of motion picture data (or video data), speech data and computer data between the mobile terminals MS1 and MS2.

The mobile terminals MS1 and MS2 are connected to each other by means of a physical layer (concretely, a mobile switching network NW). And data are transmitted in a packet called MUX-PDU as a unit. In the MUX-PDU, as shown in FIG. 2, a flag and a header are disposed on the head end, and behind them the video data, speech data and computer data are disposed alternately. Control information representing the contents of the MUX-PDU is inserted into the header.

Above the physical layer an AL/MUX layer (concretely, a multiple separation section) is disposed. In this AL/MUX layer the MUX-PDU is generated. Moreover, above the AL/MUX layer a higher-grade layer is disposed. In this layer a video channel, an audio channel and a control data channel are connected. The higher-grade layer is realized by means of a multimedia processing section described later, a speech codec section and a data communication section.

Figure 4:
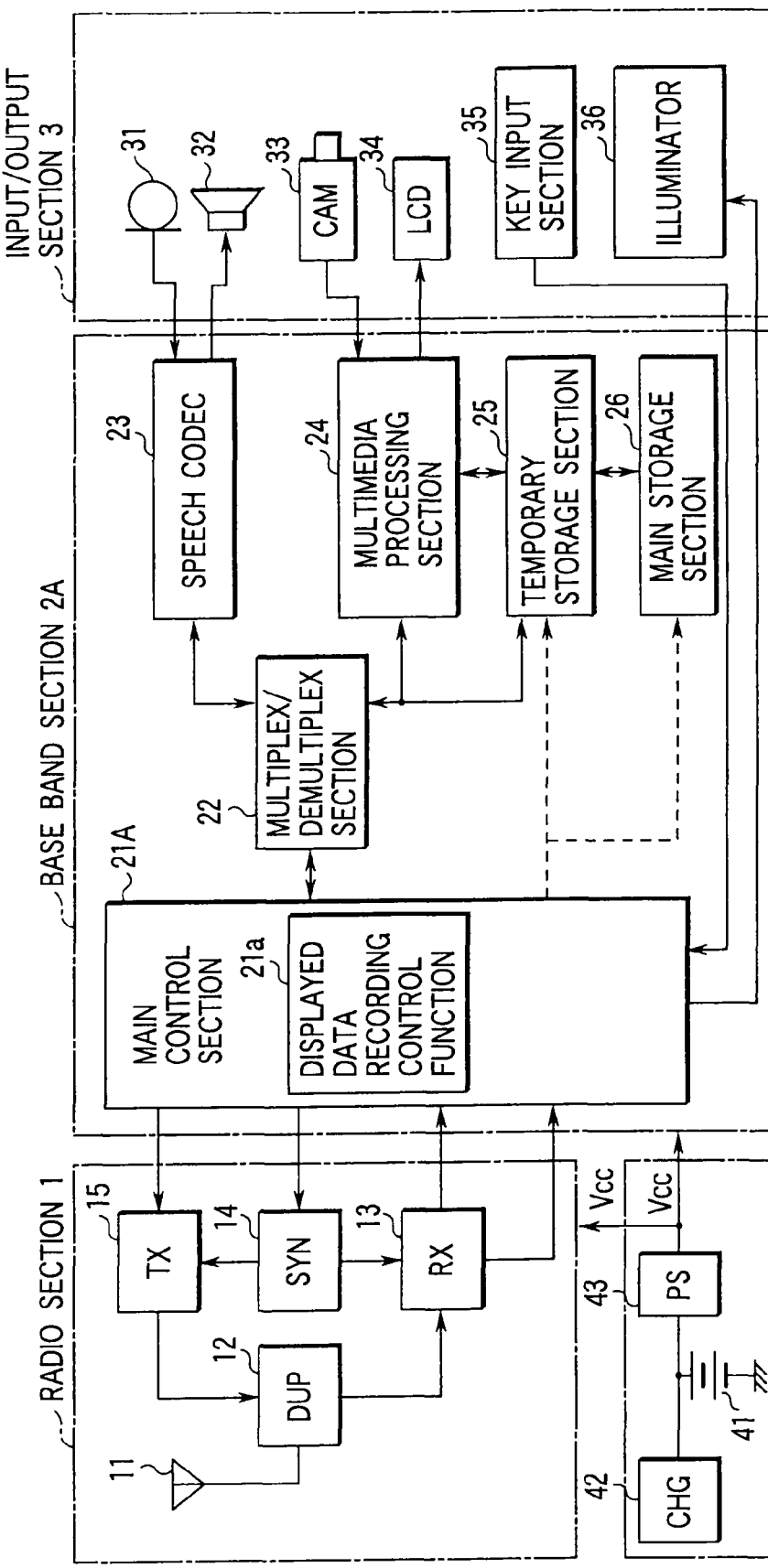
FIG. 4 is a block diagram showing the functional composition of the mobile terminal shown in FIG. 3A and FIG. 3B.

Video data are bundled and transmitted via the video channel. A MPEG-4 stream is embedded into the video channel. In this MPEG-4 stream, as shown in FIG. 4 described later, an I-Frame containing all the picture elements of one picture is transmitted first. In the subsequent frame timings, P-Frames containing mainly difference data between a current frame and the preceding frame are transmitted sequentially.

Figures 3A, 3B:
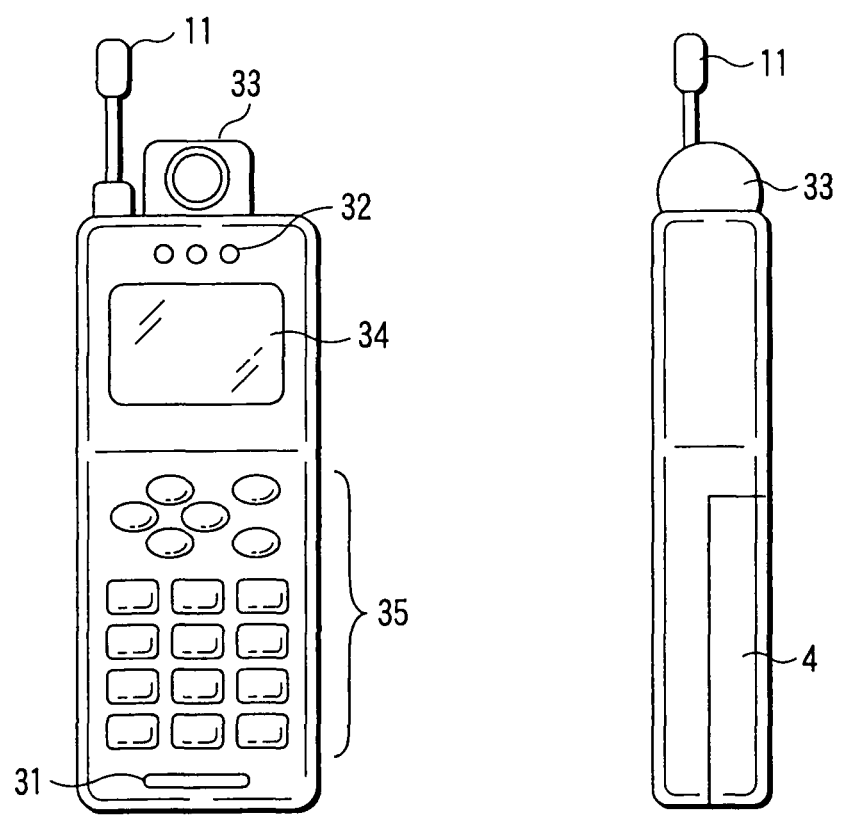
FIG. 3A and FIG. 3B are views showing the appearance of a mobile terminal that is a first embodiment of the encoded data recording apparatus according to the present invention respectively.

Now, the mobile terminals MS1, MS2, . . . are composed respectively as follows. FIGS. 3A and 3B show the appearance thereof, and FIG. 3A is a front view and FIG. 3B is a side view.

These mobile terminals MS1 and MS2 have a wireless TV phone communication function. On the front panel of the casing there are mounted a microphone 31, a speaker 32, a liquid crystal display (LCD) 34 and a key input section 35. And a telescopic antenna 11 and a camera 33 are provided on the top of the casing. This camera 33 employs a solid pickup device such as a CMOS or CCD and can pick up still pictures or motion pictures. further, on the rear of the casing there is provided a battery mounting section. A battery pack composing a power source section 4 is detachably mounted in this mounting section.

Now, the circuit of the mobile terminals MS1, MS2, . . . is composed respectively as follows. FIG. 4 is a block diagram showing the composition.

That is, the mobile terminals MS1, MS2, . . . are composed of a radio section 1, a base band section 2, an input/output section 3 and a power source section 4 respectively.

Radio frequency signals coming from the base stations BS1, BS2, . . . over radio channels for the mobile communication system are received at the antenna 11 and are subsequently inputted into a receiving circuit (RX) 13 via a duplexer (DUP) 12. The receiving circuit 13 is provided with a low-noise amplifier, a frequency converter and a demodulator.

And, after being amplified by means of the low-noise amplifier, the radio frequency signals are mixed with received local oscillating signals in the frequency converter and are down-converted into received intermediate frequency signals or received base band signals, and the output signals are demodulated digitally by means of the demodulator. Demodulation is carried out in steps of a primary demodulation and a secondary demodulation. As a primary demodulation scheme a spectrum reversed diffusion using diffusion codes is employed, and as a secondary modulation scheme an orthogonal demodulation scheme complying, for example, with a QPSK (Quadriphase Phase Shift Keying) scheme is employed. Further, the received local oscillating signals are generated by means of a frequency synthesizer (SYN) 14 according to the instruction of a main control section 21A.

Demodulated data outputted from the demodulator are inputted into a base band section 2. The base band section 2 is provided with a main control section 21A, a multiple separation section 22, a voice code decoding section (hereafter referred to as a voice codec) 23, a multimedia processing section 24, a temporary storage section 25, and a main storage section 26.

Among them, the temporary storage section 25 comprises, for example, a ring buffer or FIFO (First-in First-out) memory, and according to the instruction of the main control section 21A, it temporarily holds displaying video data reproduced by the decoding processing in the multimedia processing section 24 and non-decoded received picture frames outputted from the multiple separation section 22.

The main storage section 26 comprises, for example, a RAM (Random Access Memory) or a EEPROM (Electrically Erasable and Programmable Read Only Memory), and according to the instruction of the main control section 21A, it selectively holds decoded displaying video data and non-decoded received picture frames transferred from the temporary storage section 25. Further, a portable flash EEPROM or the like detachable from mobile terminals can be used in this main storage section 26.

In the main control section 21A it is identified whether the demodulated data are control information or multimedia information. As a result of this identification, if the demodulated data are multimedia information, they are inputted into the multiplex/demultiplex section 22 and are divided here into received voice data and received video data. And the received speech data are inputted into the speech codec 23 and are decoded here into speech signals. These decoded speech signals are amplified and outputted from the speaker 32 of the input/output section 3.

On the other hand, the received video data are inputted into the multimedia processing section 24 and are decoded into picture data by frame. These video data are fed to the liquid crystal display (LCD) 34 of input/output section 3 and are displayed.

Further, various kinds of information indicating the operational conditions of this apparatus outputted form the main control section 21A are also displayed on this LCD 34. This displayed information includes, for example, a telephone book, a detected receiving electric field intensity value and a remaining amount of power in batteries.

On the other hand, the transmitted speech signals of a terminal user outputted from the microphone 31 of the input/output section 3 are inputted into the speech codec 23 of the base band section 2A. And, after having been processed into encoded speech data here, they are inputted into the multiplex/demultiplex section 22. Further, the video signals of the face of a terminal user picked up by the camera (CAM) 33 are inputted into the multimedia processing section 24 of the base band section 2A. And, after having been processed into encoded video data here, they are inputted into the multiplex/demultiplex section 22.

In the multiplex/demultiplex section 22, the encoded speech data and the encoded video data are multiplexed according to a specified format prescribed by ITU-T H.223 or the like. These multiplexed transmitted data are inputted from the main control section 21A into the transmitting circuit (TX) 15 of the radio section 1.

The transmitting circuit 15 is provided with a modulator, a frequency converter and a transmitted power amplifier. In the modulator transmitted intermediate frequency signals are modulated digitally by the transmitted data. Modulation is carried out in steps of a primary modulation and a secondary modulation. As a primary modulation scheme, for example, a QPSK scheme is employed, and as a secondary modulation scheme there is employed a scheme in which signals after the primary modulation are spectrum-diffused by means of diffusion codes. In the frequency converter transmitted intermediate frequency signals modulated by the modulator are mixed with transmitted local oscillating signals and are up-converted into radio frequency signals with respect to the frequency. Further, the transmitted local oscillating signals are generated by the frequency synthesizer 14 according to the instruction of the main control section 21A.

By means of the transmitted power amplifier the transmitted radio frequency signals outputted from the frequency converter are amplified to a specified transmitted power level instructed by the main control section 21A. And they are fed to the antenna 11 via the duplexer 12 and are radiated from this antenna 11 towards base stations (not shown).

Further, in the power source section 4 there are provided a battery 41 using lithium ion cells, a charging circuit (CHG) 42 for charging this battery 41, and a voltage generation circuit (PS) 43. The voltage generation circuit 43 comprises, for example, a DC/DC converter and generates a specified power source voltage Vcc based on the output voltage of the battery 41.

And in the input/output section there is provided an illuminator 36. This illuminator 36 is called, for example, a back light or an illumination and illuminates the LCD 34 and the key input section 35 when a user operates keys or during communication.

The main control section 21A is provided with a microprocessor and an internal memory comprising a ROM, a RAM and the like. Further, it is newly provided with a displayed data recording control means 21a in addition to the usual control functions such as a connection control function and communication control function of radio channels. These control functions are realized by a control program contained in the ROM.

This displayed data recording control means 21a operates when a user carries out a video recording start operation in the input/output section 3 during TV phone communication operation. And in a period from the time of this video recording start operation to the time of the video recording end operation, display video data decoded and reproduced in the multimedia processing section 24 are fed to the main storage section 26 via the temporary storage section 25 and are stored sequentially so that they may be displayed on the LCD 34.

Moreover, the displayed data recording control means 21a has also a function of feeding display video data reproduced by means of a decoding processing at the time of the video recording start operation and each received picture frame outputted from the multiple separation section 22 in a period from the time of the video recording start operation to the time of the video recording end operation to the main storage section 26 via the temporary storage section 25 and of storing them sequentially.

Now, the recording operations of received video data in the mobile terminals MS1, MS2, . . . composed as described above will be described.

First Operation Example

Suppose that the mobile terminal MS1 and the mobile terminal MS2 shown in FIG. 1 start wireless TV phone communication using MPSG-4. Then, the mobile terminal MS1 generates first an I-Frame in the initial frame timing based on the video data outputted from the camera 33 and transmits this I-Frame. And in each frame timing after the second frame, a P-Frame mainly composed of difference information between the video data of the current frame and the video data of the previous frame is generated, and this P-Frame is transmitted sequentially.

On the other hand, the mobile terminal MS2 receives first the I-Frame transmitted from the mobile terminal MS1, reproduces one-picture data in the multimedia processing section 24 based on this I-Frame and displays these one-picture data on the LCD 34. And in the subsequent frame timings respectively the P-Frames transmitted from the mobile terminal MS1 are received sequentially. And by adding these P-Frames to the picture data reproduced by means decoding processing respectively in the previous frames, the one-picture data are reproduced, and these one-picture data are displayed sequentially on the LCD 34.

Figure 5:
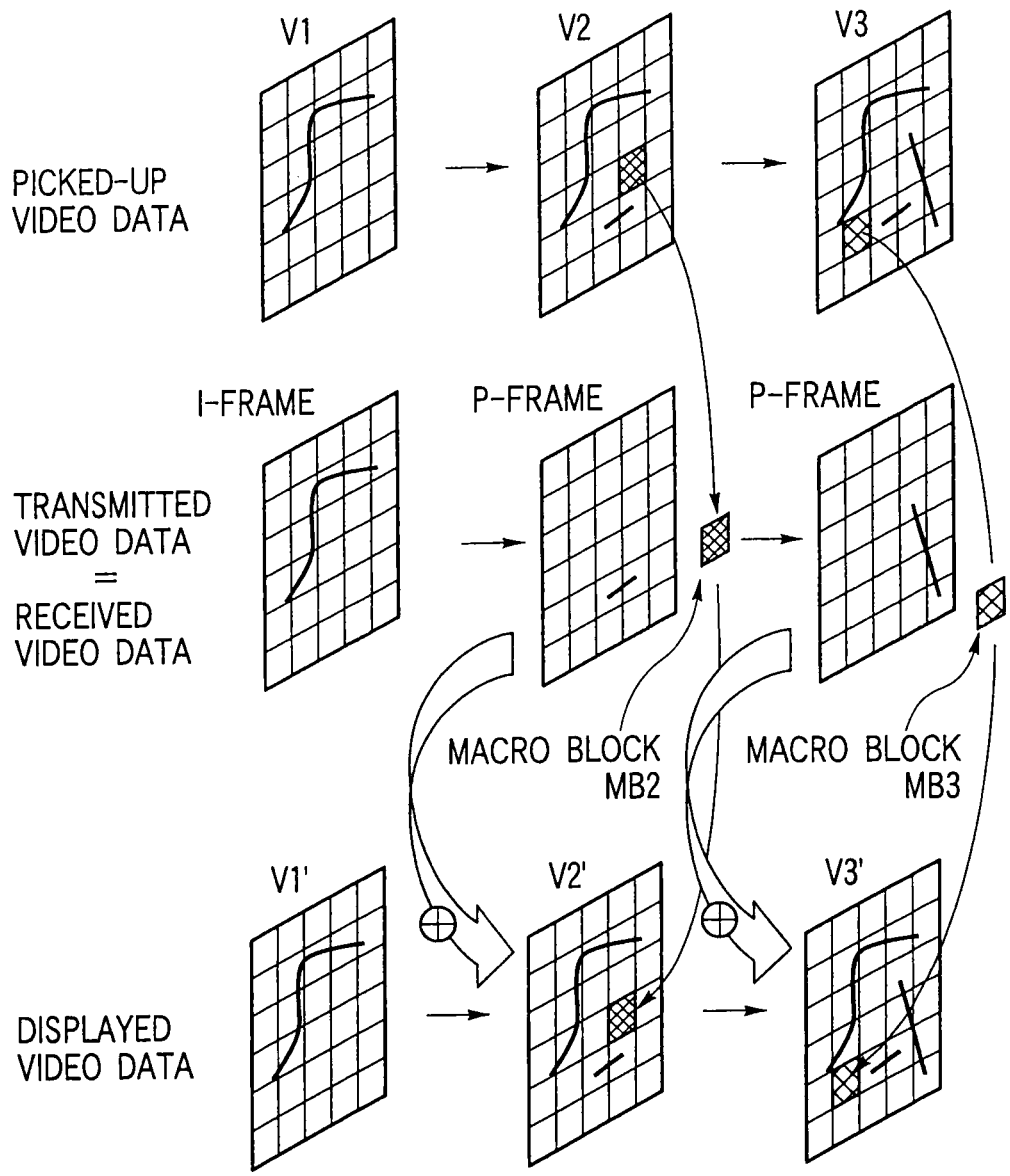
FIG. 5 is a view for illustrating the operation of a video data compression scheme using MPEG-4.

FIG. 5 shows an operation example of the video data transmission scheme using the MPEG-4 in the form of a model. In the same figure, suppose that video data shown in V1, V2, V3, . . . are outputted sequentially from the camera 33, for example, in the mobile terminal MS1 of the transmitting side.

Then the mobile terminal MS1 encodes first the picture data V1 as still picture data and transmits the encoded picture data obtained thereby as an I-Frame. On the other hand, the mobile terminal MS2 reproduces one-picture data V1' based on the received I-Frame and displays this on the LCD 34.

Next, each time the picture data V2, V3, . . . are outputted from the camera 33, the mobile terminal MS1 detects the differences between these picture data V2, V3, . . . and the picture data V1, V2, . . . of the previous frame respectively. And picture data mainly composed of this difference information are generated respectively and these picture data are transmitted as a P-Frame. On the other hand, each time the P-Frame is received, the mobile terminal MS2 adds the difference information thereof to the display picture data V1', V2', . . . produced in the previous frames respectively, thereby reproducing one-picture data. And these reproduced display picture data V2', V3', . . . of one-picture are displayed sequentially on the LCD 34.

Now, suppose that a user has inputted a video recording start instruction by operating the key input section 35, for example, in the mobile terminal MS2 in a condition of carrying out the TV phone communication as described above.

Figure 6:
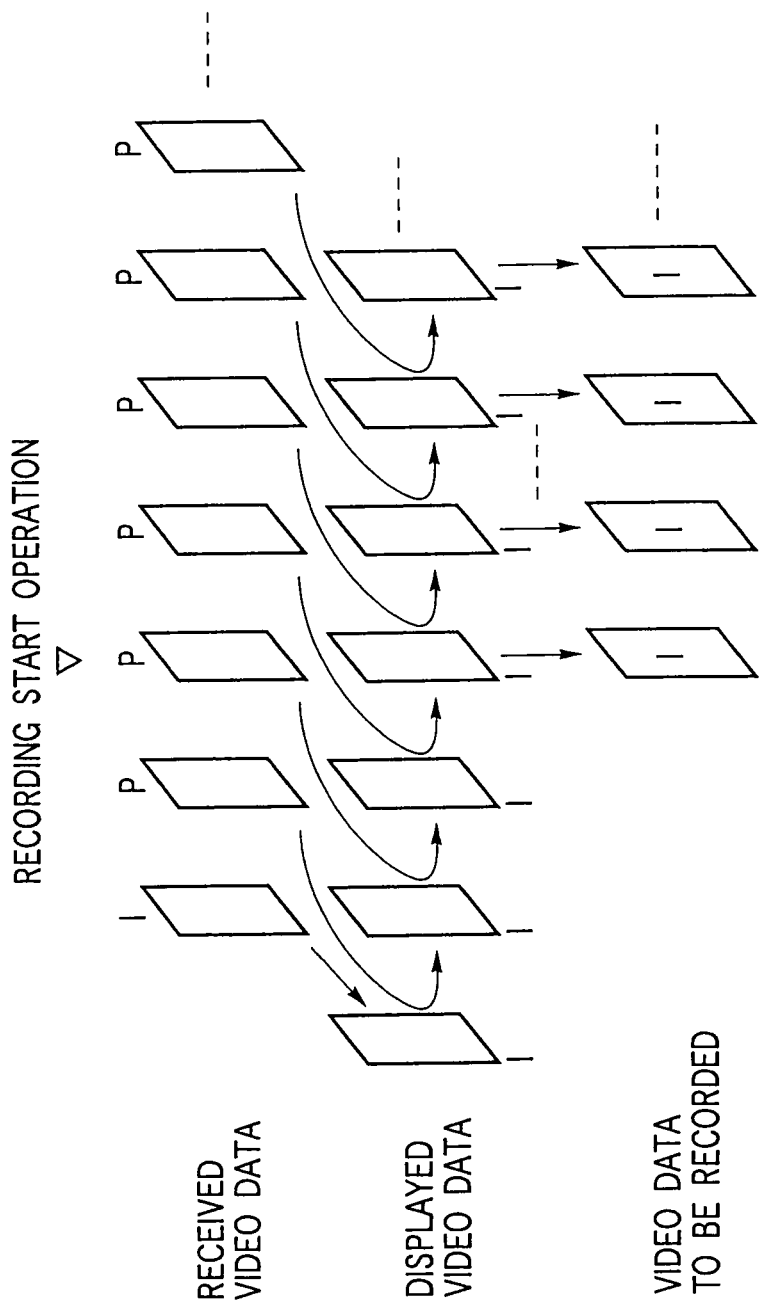
FIG. 6 is a view showing a first example of the recording operations of video data carried out by means of the mobile terminal shown in FIG. 4.

Then the main control section 21A of the mobile communication terminal MS2 feeds display video data reproduced by means in the multimedia processing section 24 to the main storage section 26 via the temporary storage section 25 at this time and stores them in the main storage section 26. And the display data received subsequently till the recording end operation and reproduced in the multimedia processing section 24 are respectively fed to the main storage section 26 via the temporary storage section 15 sequentially and are stored in the main storage section 26. FIG. 6 shows how this recording operation is carried out.

Therefore, even if the video recording start operation is carried out in receiving a video data stream, display video data reproduced by the decoding processing in the multimedia processing section 24 are recorded sequentially in the main storage section 26 from the time of the operation. As a result thereof, when the display video data recorded in the main storage section 26 are reproduced, high quality video data equivalent to the I-Frame can be reproduced from the time of the video recording start operation.

Second Operation Example

In the first operation example described above, in the whole period from the video recording start operation to the video recording end operation, display video data decoded in the multimedia processing section 24 and equivalent to the I-Frame are recorded in the main storage section 26.

Figure 7:
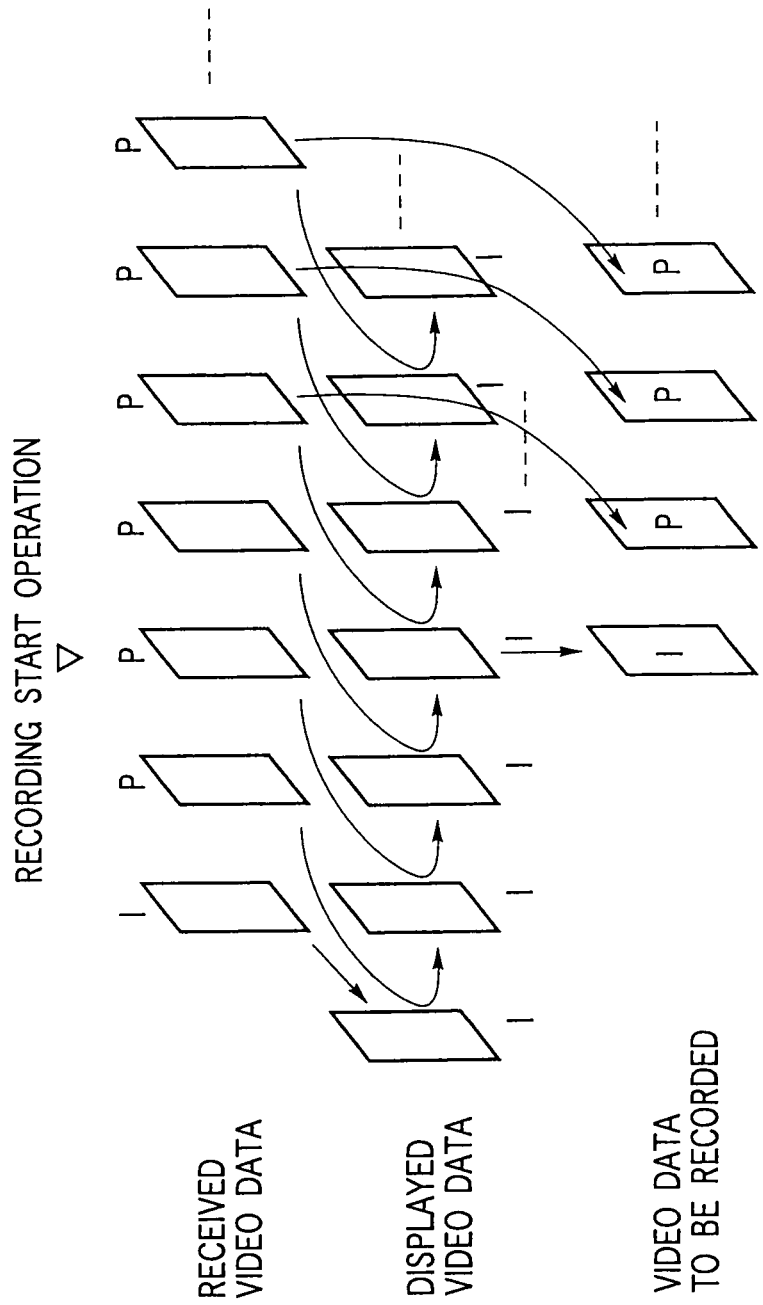
FIG. 7 is a view showing a second example of the recording operations of video data carried out by means of the mobile terminal shown in FIG. 4.

However, the storage of display video data is not limited thereto. For example, as shown in FIG. 7, only at the time of the video recording start, display video data decoded in the multimedia processing section 24 and equivalent to the I-Frame are recorded in the main storage section 26. And in the subsequent period till the video recording end operation, received picture frames, that is, P-Frames, may be stored in the main storage section 26.

By doing this, over the whole period from the video recording start operation to the video recording end operation, in comparison to the case in which display video data decoded in the multimedia processing section 24 and equivalent to the I-Frame are recorded, the amount of video data recorded in the main storage section 26 can be reduced substantially. As a result thereof, the storage capacity of the main storage section 26 can be used effectively, thereby prolonging the recording time of video data.

Second Embodiment

In a second embodiment of the present invention, at the time of a video recording start operation carried out by a user, display video data reproduced by a decoding processing in the multimedia processing section are returned to the multimedia processing section, are re-encoded into an I-Frame and are subsequently stored in the main storage section. Further, in a period from the time of the video recording start operation to the time of a video recording end operation, display video data reproduced by a decoding processing in the multimedia processing section are returned to the multimedia processing section, are re-encoded into P-Frames and are stored in the main storage section.

FIG. 8 is a block diagram showing the functional organization of a mobile terminal having an encoded data recording function according to the second embodiment. Further, in the same figure, the identical sections to FIG. 4 are marked with the identical symbols, and detailed descriptions will be omitted.

The main control section 21B of a base band section 2B is provided with a displayed data recording control means 21b and a re-encoding control means 21c as new control functions according to the present invention.

When a video recording start operation is carried out in the input/output section 3 during communication, the displayed data recording control means 21b carries out main processing operations for storing display video data reproduced by a decoding processing in the multimedia processing section 24 in the main storage section 26 for a period from the time of this video recording start operation to the time of a video recording end operation.

When the displayed data recording control means 21b stores the display video data in the main storage section 26, the re-encoding control means 21c returns these display video data to be recorded to the multimedia processing section 24 and re-encodes them. And an I-Frame and P-Frames generated by this re-encoding are stored in the main storage section 26.

In such a composition, supposes that a user carries out a picture recording start operation during TV phone communication. Then the main control section 21B inputs display video data reproduced by means of a decoding processing in the multimedia processing section 24 into the encoding section in the multimedia processing section at the time of this video recording start operation. And an I-Frame obtained by a re-encoding processing in this encoding section is stored in the main storage section 26 via the temporary storage section 25.

For a period till a user carries out a video recording end operation, each time display video data are reproduced by a decoding processing of the multimedia processing section 24, the display video data are inputted into the encoding section in the multimedia processing section 24 and are re-encoded. And P-Frames generated by this re-encoding processing are stored sequentially in the main storage section 26 via the temporary storage section 25.

Figure 9:
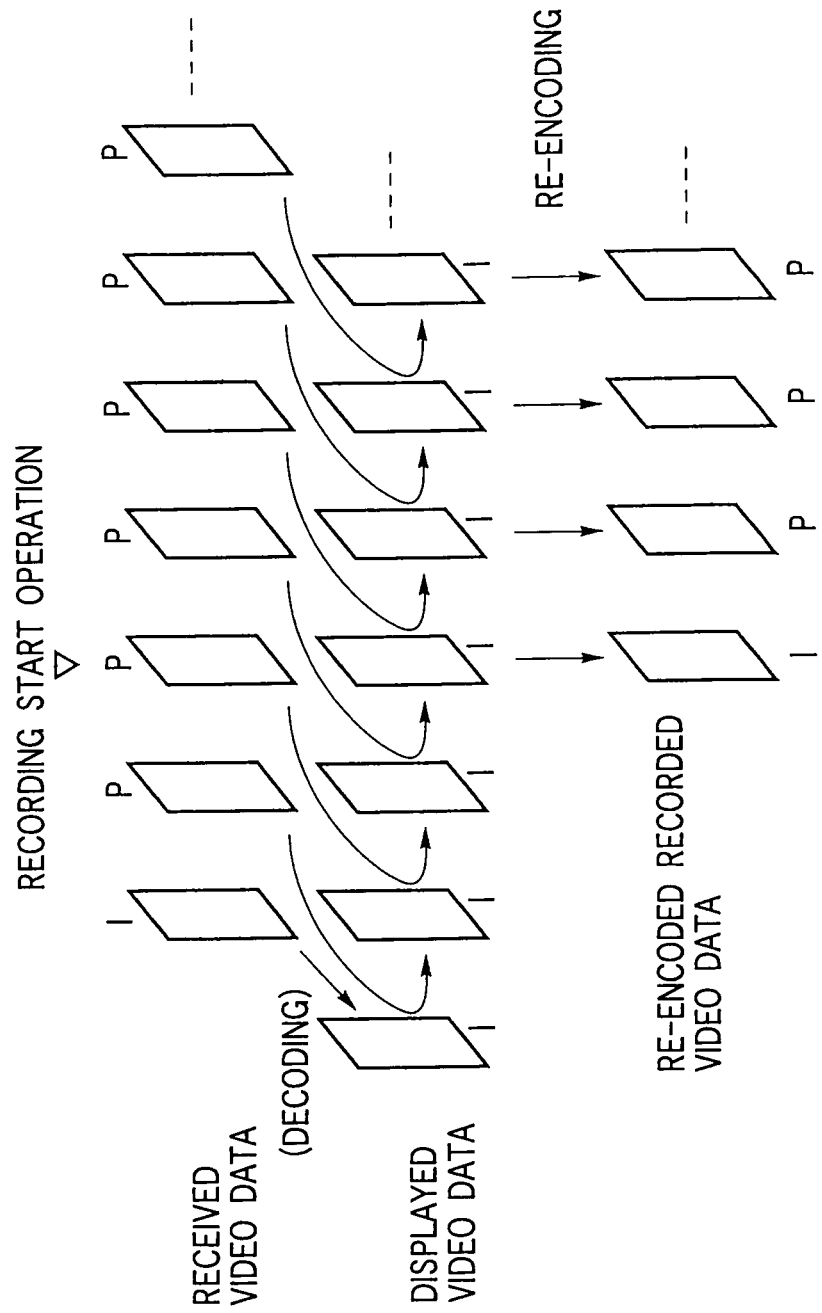
FIG. 9 is a view showing the recording operations of picture data carried out by means of the mobile terminal shown in FIG. 8.

FIG. 9 shows how the recording operation of video data using this re-encoding processing is carried out.

Further, for a period from the video recording start operation to the video recording end operation, the main control section 21B stops the encoding processing of transmitted video data in the multimedia processing section 24 temporarily for re-encoding display video data.

As described above, according to the second embodiment, display video data reproduced by a decoding processing in the multimedia processing section 24 are re-encoded in the multimedia processing section 24 and are recorded in the main storage section 26. Therefore, the received video data can be recorded in a compressed condition. Accordingly, the amount of video data recorded in the main storage section 26 can reduced. As a result thereof, the storage capacity of the main storage section 26 can be used more effectively, thereby prolonging the recording time of video data.

Moreover, the re-encoding processing of display video data is carried out in the encoding section of the existing multimedia processing section 24. Therefore, no encoder for re-encoding is newly required. Accordingly, a mobile terminal with larger-sized circuitry can be avoided.

Third Embodiment

In a third embodiment according to the present invention, when a user carries out a video recording start operation during wireless TV phone communication using MPEG-4, display video data reproduced by a decoding processing in the multimedia processing section for a period from the time of this picture recording operation to the time of a picture recording end operation are held temporarily in the temporary storage section. And, after the end of the TV phone communication, the display video data held in the temporary storage section are read out, are inputted into the multimedia processing section and are re-encoded into an I-Frame and a plurality of subsequent P-Frames. And the I-Frame and the plurality of subsequent P-Frames obtained by means of this re-encoding are stored in the main storage section.

Figure 10:
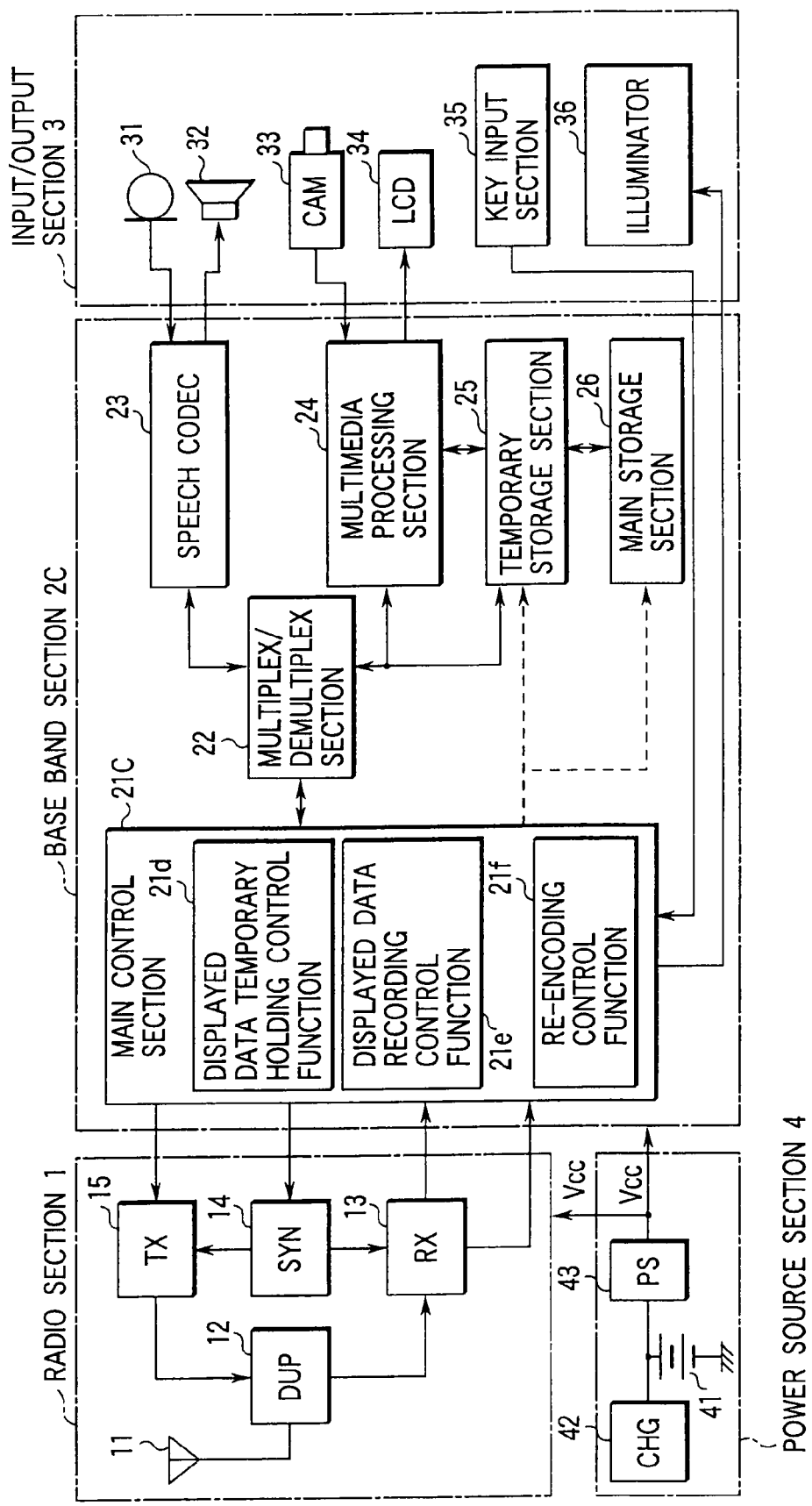
FIG. 10 is a block diagram showing the functional organization of a mobile terminal that is a third embodiment of the encoded data recording apparatus according to the present invention.
Figure 11:
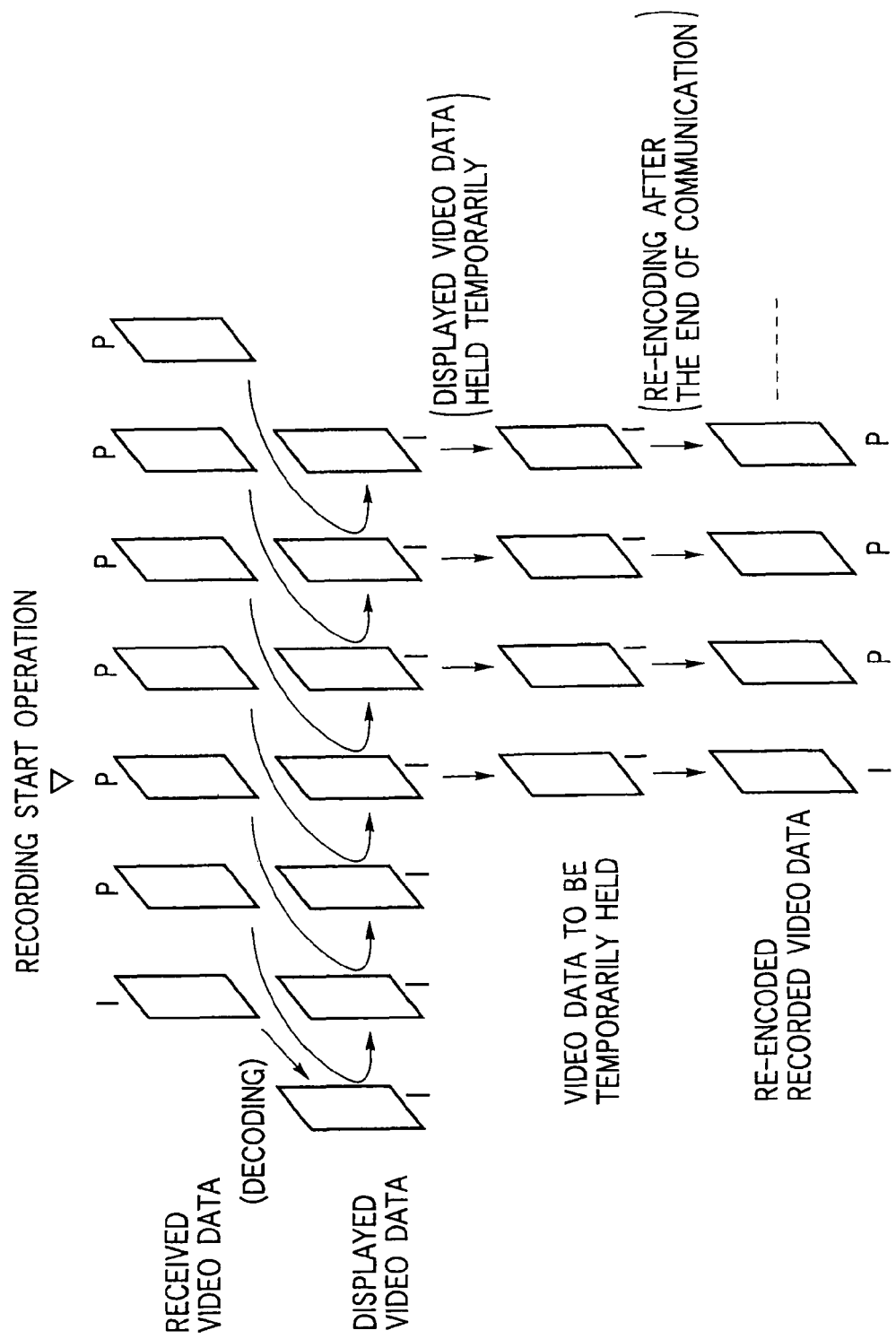
FIG. 11 is a view showing the recording operations of video data carried out by means of the mobile terminal shown in FIG. 10.

FIG. 10 is a block diagram showing the functional organization of a mobile terminal having an encoded data recording function according to the second embodiment. Further, in the same figure, the identical sections to FIG. 8 are marked with the identical symbols, and detailed descriptions will be omitted.

The main control section 21C of a base band section 2C is provided with a displayed data holding control means 21d, a displayed data recording control means 21e and a re-encoding control means 21f as new control functions according to the present invention.

When a user carries out a video recording start operation during wireless TV phone communication, display video data reproduced by a decoding processing in the multimedia processing section 24 for a period from the time of this video recording start operation to the time of a video recording end operation are held temporarily in the temporary storage section 25.

The displayed data recording control means 21e monitors the end of the wireless TV phone communication. And the communication comes to end, the display video data held in the temporary storage section 25 are read out and are inputted into the multimedia processing section 24. And an I-Frame and P-Frames obtained by this re-encoding processing in the multimedia processing section 24 are stored in the main storage section 26.

The re-encoding control means 21f controls the operation of the multimedia processing section 24 and re-encodes the display video data read out from the temporary memory section 25.

Due to such a composition, when a video recording start operation is carried out during communication, display video data decoded by the multimedia processing section 24 for a period from the time of this video recording start operation to the time of a video recording end operation are transferred to the temporary storage section 25 and are held therein under control of the main control section 21C. And subsequently, when the end of communication is detected, the display video data held in the temporary storage section 25 are read out sequentially in order of time under control of the main control section 21C, are inputted into the encoding section of the multimedia processing section 24 and are re-encoded into an I-Frame and subsequent P-Frames. And these re-encoded I-Frame and P-Frames are stored in the main storage section 26 via the temporary storage section 25.

Therefore, according to the third embodiment, as in the second embodiment, since display video data are re-encoded in the multimedia processing section 24 and are recorded in the main storage section 26, the received video data can be recorded in a compressed condition. Accordingly, the amount of video data recorded in the main storage section 26 can reduced. As a result thereof, the storage capacity of the main storage section 26 can be used more effectively, thereby prolonging the recording time of video data.

Further, in the third embodiment, the re-encoding processing is carried out after the end of communication. Therefore, the re-encoding processing of video data to be recorded is permitted without stopping the encoding processing of transmitted data by the multimedia processing section 24 temporarily. Moreover, the processing load of the main control section 21C can be reduced, and therefore, no CPU or DSP having a high processing capability is required.

Other Embodiments

In the second embodiment, when display video data are re-encoded in the multimedia processing section 24, the encoding processing of transmitted data is stopped temporarily. However, the multimedia processing section 24 has a sufficient signal processing capability, the encoding processing of transmitted picture data and the re-encoding processing of display video data may be carried out in time sharing.

As a result thereof, received video data can be recorded concurrently with video data being transmitted. Further, after the end of communication, recorded received picture data can be reproduced instantaneously.

Moreover, another video encoder for re-encoding display video data may be provided in addition to the multimedia processing section 24 and the re-encoding processing of display video data may be carried out by this picture encoder. In this case, as a video encoder for re-encoding display video data, an encoder permitting a higher-quality encoding such as a MPEG-2 encoder is preferably used.

Further, as an encoding compression/extension scheme of video data, other schemes such as ITU-T H.263 or the like than MPEG-4 may be employed, and with respect to data to be transmitted, still video data and other data may be transmitted in addition to motion picture data.

Further, in the above-described embodiments, a case in which wireless TV phone communication is maintained between the mobile terminals MS1 and MS2 is described. However, in addition thereto, the present invention is also applicable, for example, to a case in which a mobile terminal is connected to a WWW server or the like on Internet via a network NW and information contained in a home page or the like is down-loaded from this server. Moreover, the present invention is also applicable to a case in which an electronic mail accompanied by motion picture data is received.

In the above-described embodiments, a mobile communication is described as an example. However, the present invention can be applied to a radio transmission system and the like between equipment using a short distance radio data transmission scheme represented by wireless LAN and BT (Bluetooth), and further it may be applied to a cable transmission system such as a subscriber network using metallic cables or optical fiber cables and a cable television broadcasting network.

Moreover, as an encoded data recording apparatus, a recorder or the like recording video data or audio data received by a television tuner or a car radio is included in addition to communication terminals such as a mobile terminal, a PDA and a personal computer.

Further, as an encoded data input means, means acquiring data from a mobile recording medium such as a CD, a DVD or a memory card are included in addition to means into which encoded data are inputted from an external equipment by using a cable or a radio link.

And besides, it is to be understood that various changes in the kind and the composition of terminals, the construction of a re-encoding means and the like may be made without departing the summary of the present invention.

INDUSTRIAL APPLICABILITY

As described above in detail, in the present invention, when a data display control means for receiving first data and second data, reproducing frame data of each frame based on these data and displaying the frame data sequentially on the display is provided, at least the newest frame data are held temporarily in the data holding means each time frame data are reproduced by this data display control means. And when a recording instruction of the received data is inputted in receiving the first data and the second data, reproduced frame data held temporarily in the data holding means are recorded in a recording medium in the order corresponding to the time of having inputted the recording instruction.

Therefore, according to the present invention, there can be provided an encoded data recording apparatus and a mobile terminal capable of recording high-quality data immediately after having inputted a recording instruction by using reproduced display frame data even if recording is begun in receiving data.

The invention claimed is:
1. An encoded data recording apparatus for recording encoded data composed of first data generated based on original data having correlations on the time axis in an initial frame timing thereof and of a plurality of second data generated respectively in a plurality of frame timings subsequent to said initial frame timing, said first data having an independent meaning alone and said plurality of second data containing mainly a difference between the original data of a current frame and the original data of the preceding frame respectively, said apparatus comprising:
   encoded data input means for inputting said encoded data;
   data reproduction processing means for reproducing said original data based on the first data and the second data of the encoded data inputted by means of this data input means;
   recording period specifying means for specifying the recording period of said encoded data; and
   recording control means for recording the original data reproduced by said data reproduction processing means in the recording period concerned in a recording medium when the recording period is specified by said recording period specifying means in period inputting said encoded data, a re-encoding control part configured to re-encode the reproduced original data into the first data and the second data except in a period when the encoded data are input by the encoded data input means and during the recording period so that no concentrated processing load is realized so as to reduce the processing burden of a central processing unit or a data signal processor (DSP).

2. The encoded data recording apparatus according to claim 1 wherein said recording control means records the original data reproduced by said data reproduction processing means in a recording medium in the first frame timing of said recording period and records the second data inputted by said encoded data input means in said recording medium in the frame timings subsequent to said first frame timing.

3. The encoded data recording apparatus according to claim 1, wherein said recording control means comprises:
re-encoding means for re-encoding the original data reproduced by said data reproduction processing means in said recording period into first data and a plurality of second data; and
means for recording the first data and the plurality of second data obtained by said re-encoding means in said recording medium.

4. The encoded data recording apparatus according to claim 1, wherein said recording control means comprises:
recorded data holding means for holding the original data reproduced by said data reproduction processing means in said recording period temporarily till the input period of said encoded data comes to an end; and
means for re-encoding the original data held temporarily in said recorded data holding means into first data and a plurality of second data and recording them in said recording medium after the input period of said encoded data has come to an end.

5. A mobile terminal for receiving over radio channels and recording encoded data composed of first data generated based on the original data having correlations on the time axis in the initial frame timing thereof and of a plurality of second data generated respectively in a plurality of frame timings subsequent to said initial frame timing, said first data having an independent meaning alone and said plurality of second data containing mainly a difference between the original data of a current frame and the original data of the preceding frame respectively, said mobile terminal comprising:
radio receiving means for receiving encoded data transmitted over said radio channels;
data reproduction processing means for reproducing said original data based on the first data and the second data of the encoded data received by said radio receiving means;
recording period specifying means for specifying the recording period of said encoded data;
recording control means for recording the original data reproduced by said data reproduction processing means in the recording period concerned in a recording medium when the recording period is specified by said recording period specifying means in receiving said encoded data; and
a re-encoding control part configured to re-encode the reproduced original data into the first data and the second data except in a period when the encoded data are input by the encoded data input means and during the recording period so that no concentrated processing load is realized so as to reduce the processing burden of a central processing unit or a data signal processor (DSP).

6. The mobile terminal according to claim 5, wherein said recording control means records the original data reproduced by said data reproduction processing means in a recording medium in the first frame timing of said recording period and records the second data of the encoded data received by said radio receiving means in said recording medium in the frame timings subsequent to said first frame timing.

7. The mobile terminal according to claim 5, wherein said recording control means comprises:
re-encoding means for re-encoding the original data reproduced by said data reproduction processing means in said recording period into first data and a plurality of second data; and
means for recording the first data and the plurality of second data obtained by said re-encoding means in said recording medium.

8. The mobile terminal according to claim 7, wherein, when transmission encoding means for encoding the original data to be transmitted into first data and a plurality of second data and transmitting them wirelessly is provided,
said transmission encoding means functions also as said re-encoding means.

9. The mobile terminal according to claim 5, wherein said recording control means comprises:
recorded data holding means for holding the original data reproduced by said data reproduction processing means in said recording period temporarily till the receiving period of said encoded data comes to an end;
re-encoding means for re-encoding the original data held temporarily in said recorded data holding means into first data and a plurality of second data after the receiving period of said encoded data has come to an end; and
means for recording the first data and the plurality of second data obtained by said re-encoding means in said recording medium.

10. The mobile terminal according to claim 9, wherein, when a transmission encoding means for encoding the original data to be transmitted into first data and a plurality of second data and transmitting them wirelessly is provided,
said transmission encoding means functions also as said re-encoding means.

11. The mobile terminal according to claim 5, wherein said data reproduction processing means reproduces original data according to a data decoding scheme specified in MPEG-4 (Moving Picture Experts Group-4).

12. An encoded data recording apparatus for recording encoded data composed of first data generated based on original data having correlations on a time axis in an initial frame timing thereof and of a plurality of second data generated respectively in a plurality of frame timings subsequent to the initial frame timing, the first data having an independent meaning alone and the plurality of second data containing a difference between original data of a current frame and original data of a preceding frame respectively, the apparatus comprising:
means for receiving the encoded data;
means for reproducing the original data for each frame, by performing decoding based on independent information and a plurality of dependent information of the received encoded data;
data holding means for temporarily holding the reproduced original data each time the original data is reproduced for each frame;
recording control means for successively recording, in a recording medium, a part of the original data temporarily held in the data holding means when a recording start instruction is input at a predetermined timing during a receiving period of the encoded data, the part of the original data being data of a frame corresponding to a time when the recording start instruction is input and data of frames subsequent to the frame; and re-encoding control means for re-encoding the reproduced original data into the first data and the second data except in a period when the encoded data are input by the encoded data input means and during the recording period so that no concentrated processing load is realized so as to reduce the processing burden of a central processing unit or a data signal processor (DSP).

* * * * *